United States Patent [19]

Frankenberg

[11] 3,750,119

[45] July 31, 1973

[54] COMPUTER MEMORY TEMPERATURE COMPENSATION

[75] Inventor: Robert J. Frankenberg, San Jose, Calif.

[73] Assignee: Hewlett-Packard Company, Palo Alto, Calif.

[22] Filed: Oct. 20, 1971

[21] Appl. No.: 191,086

[52] U.S. Cl. .................. 340/174 SC, 323/7, 323/68, 340/174 NC

[51] Int. Cl. .................. G11c 7/04

[58] Field of Search .................. 307/310; 317/41; 323/7, 68, 69, 100; 324/32; 340/174 SC

[56] References Cited

UNITED STATES PATENTS

| | | | |
|---|---|---|---|
| 2,438,495 | 3/1948 | Chatterjea | 323/68 X |
| 3,259,832 | 7/1966 | Summerer | 323/68 X |
| 3,299,345 | 1/1967 | Werts | 323/69 X |
| 3,354,443 | 11/1967 | Kuhlmann | 340/174 SC |
| 3,644,864 | 2/1972 | Hirsbrunner et al. | 323/69 X |

*Primary Examiner*—A. D. Pellinen
*Attorney*—A. C. Smith

[57] ABSTRACT

In a computer having a plurality of memory units, a series resistor is connected between the memory power supply and each memory unit. A temperature sensor is located near the series resistors such that it senses the average of the temperature of those resistors and such that, in the absence of current flowing through the series resistors, the sensor senses the ambient temperature of the computer. A control circuit for the power supply is connected to the sensor to effect temperature compensation of the power supply drive to the memory units.

2 Claims, 2 Drawing Figures

COMPUTER MEMORY TEMPERATURE COMPENSATION

BACKGROUND OF THE INVENTION

Computer memories using magnetic cores are often divided into units known as core stacks, and each core stack contains some convenient number of storage locations, such as 4,096 words. Information is written into and read out of the cores by passing a current through wires passing through the appropriate cores. A variable current power supply is provided to supply the necessary drive current, since the current required depends on the amount of information flowing in and out of the memory and on the temperature of the memory. Usually a lower drive current is required for higher temperatures since core output or sensitivity increases with temperature.

There are two principal sources of temperature change in a computer that affect the computer memory. The first is the heat from the computer circuitry exclusive of the memory and the second is the heat developed within the memory by the current passing through it. Significant amounts of heat are contributed by each source and thus any compensation scheme must take both into account. One prior art method of compensation was to place a temperature sensor in each core stack. The sensors were connected to a control circuit which averaged the output of the sensors to produce a control signal for the power supply. This method, however, was cumbersome and required the difficult selection of an electronic averaging function that would optimize the compensation over a broad range of possible operating conditions.

A second prior art method used one temperature sensor to measure the ambient temperature of the computer. The sensor was connected to a control circuit which allowed for a constant nominal temperature rise in the core stacks. While the system was simple, it was not very accurate, and it presented particular difficulties when the memory had cooled after not being used for a long period of time.

SUMMARY OF THE INVENTION

In the present invention a current sensitive element such as a resistor is connected in series with each core stack memory unit and the memory power supply. The temperature of each resistor will be a function of the current passing through it and the core stack to which it is connected. These resistors are all placed near each other on a circuit board and the average temperature rise of that circuit board represents the average temperature rise of the core stacks. A temperature sensor is placed on the circuit board such that it senses the average temperature of the circuit board. The circuit board, in turn, is so placed within the computer that the temperature sensor measures the ambient temperature of the computer in the absence of current flowing through the series resistors. Thus the output of the temperature sensor is the thermal sum of the ambient temperature of the computer and the average temperature rise of the core stack above the ecomputer ambient due to the drive current. This output is fed to a power supply control circuit to adjust the drive current to the memory core stacks.

DESCRIPTION OF THE PREFERRED EMBODIMENT

Figure 1:
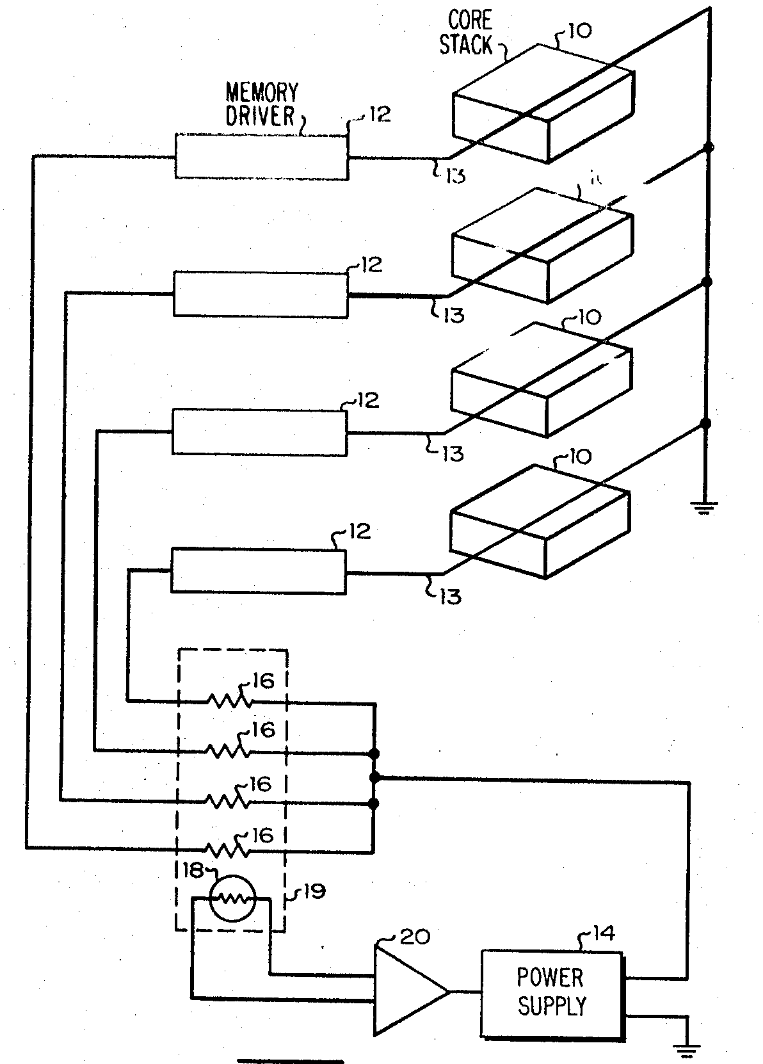
FIG. 1 shows a simplified schematic representation of a computer memory embodying the present invention.

A typical core memory has three sets of information access lines passing through the cores which are usually denoted the digit driver, "X" address, and "Y" address lines. Current is passed through various combinations of these lines to write and read information in the memory. The desired combination for each operation is established by control circuitry external to the core stack. Each core stack typically has its own control circuitry which, in turn, is connected to a common power supply. FIG. 1 shows a simplified block diagram of four core stacks 10 connected to corresponding memory driver elements 12 through digit driver lines 13; the "X" and "Y" address lines have been omitted for clarity. The driver elements 12 are connected to the common power supply 14 through resistors 16. While each of the digit driver lines 13 have been illustrated as a single wire, there is actually a plurality of wires corresponding to groups of cores. Memory driver element 12 selects which of the plurality of wires will receive current from power supply 14, according to the desired memory operation. There are, of course, corresponding memory driver elements for the "X" and "Y" address lines.

Since the current passing through each resistor 16 is the same as that passing through the corresponding core stack 10, the temperature rise of each resistor due to current passing through it will be proportional to the temperature rise of the core stack to which that resistor is connected. Although current is passing through the "X" and "Y" address lines as well as the digit driver lines 13, a resistor in series with any one of the lines will give a reliable indication of the total temperature rise caused by the power dissipated in that core stack since the average current distribution among the lines is approximately constant. The average temperature of resistors 16 is measured by a temperature sensor 18 connected to a control circuit 20.

Figure 2:
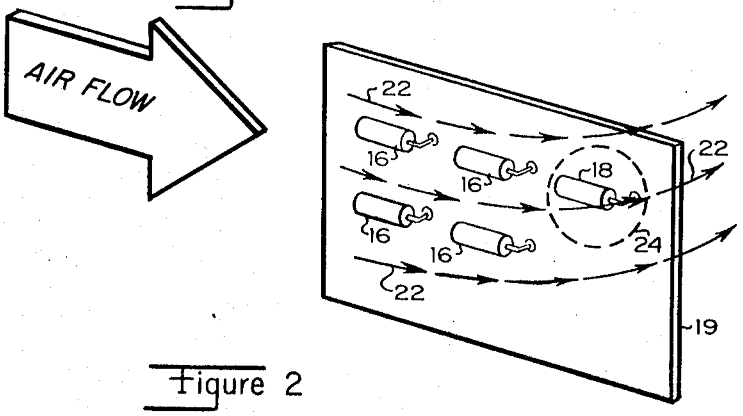
FIG. 2 shows an arrangement of series resistors and a temperature sensor on a circuit board.

As shown in FIG. 2 temperature sensor 18, a thermistor or a temperature sensitive resistor, for example, is mounted on circuit board 19 in close physical proximity to resistors 16 to insure effective thermal coupling. As illustrated, one means of insuring good thermal coupling is to place circuit board 19 in a flow of air that, for example, amy be generated by a cooling fan in the computer. Arrows 22 illustrate a possible flow path for a horizontal air stream being driven past board 19. Note that the air will be warmed as it passes over series resistors 16 and this will rise as it approaches sensor 18. The appropriate location for sensor 18 may be determined empirically by making a thermal map of the air stream temperature to locate a region of average temperature. Thus in the example shown in FIG. 2 the area denoted by dotted line 24 is a region of average temperature. Regions of average temperature have been mapped on circuit boards, similar to that shown in FIG. 2, having larger numbers of resistors.

Resistors 16 and sensor 18 are located within the computer at a point which is at substantially the ambient temperature of the core stack when it has not been heated by drive current, i.e., when the core stack is at the ambient temperature of the computer. Sensor 18 thus measures the sum of the ambient temperature of the computer and the average temperature rise of the core stacks due to the power dissipated therein. That sum represents the average temperature of the core stacks — the quantity that must be compensated for. The control circuit, a servo amplifier for example, will cause the drive current to change when the temperature changes, whether the change is due to a change in ambient temperature or core stack use.

The temperature compensation scheme herein disclosed can also be used with other electronic systems that require a drive current having a value dependent upon temperature. For example, a magnetic disc or drum memory may have several separate memory elements and the present scheme can be used to compensate the drive current to the read and record heads.

I claim:

1. In an electronic apparatus having a plurality of magnetic memory core stacks requiring a temperature dependent drive current, a variable current power supply, and control circuitry for providing a continuously variable control of the output of the power supply, the improvement comprising:

a plurality of resistors, each resistor connected between the power supply and one of the plurality of magnetic memory core stacks and each resistor having a thermal output proportional to the current passing therethrough; and a temperature sensitive transducer mounted in the immediate proximity of the plurality of resistors for sensing the average temperature of the plurality of resistors, and mounted within the electronic apparatus for sensing the ambient temperature of the electronic apparatus in the absence of current passing through the resistors, the temperature sensitive transducer being connected to the control circuitry for causing a continuously variable change in the output current in response to changes in the average temperature of the magnetic memory core stacks and the ambient temperature of the electronic apparatus.

2. The improvement of claim 1 including a means for circulating air and a circuit board mounted within the electronic apparatus wherein:

the resistors and the temperature sensitive transducer are mounted on the circuit board which is located in the flow of air from the air circulating means.

* * * * *